Nov. 17, 1970  S. G. B. OLFALK  3,540,212

STAPLE BAR PRODUCING MACHINES

Filed Nov. 27, 1968  4 Sheets-Sheet 1

INVENTOR.
Sten Gustav Birger Olfalk
BY

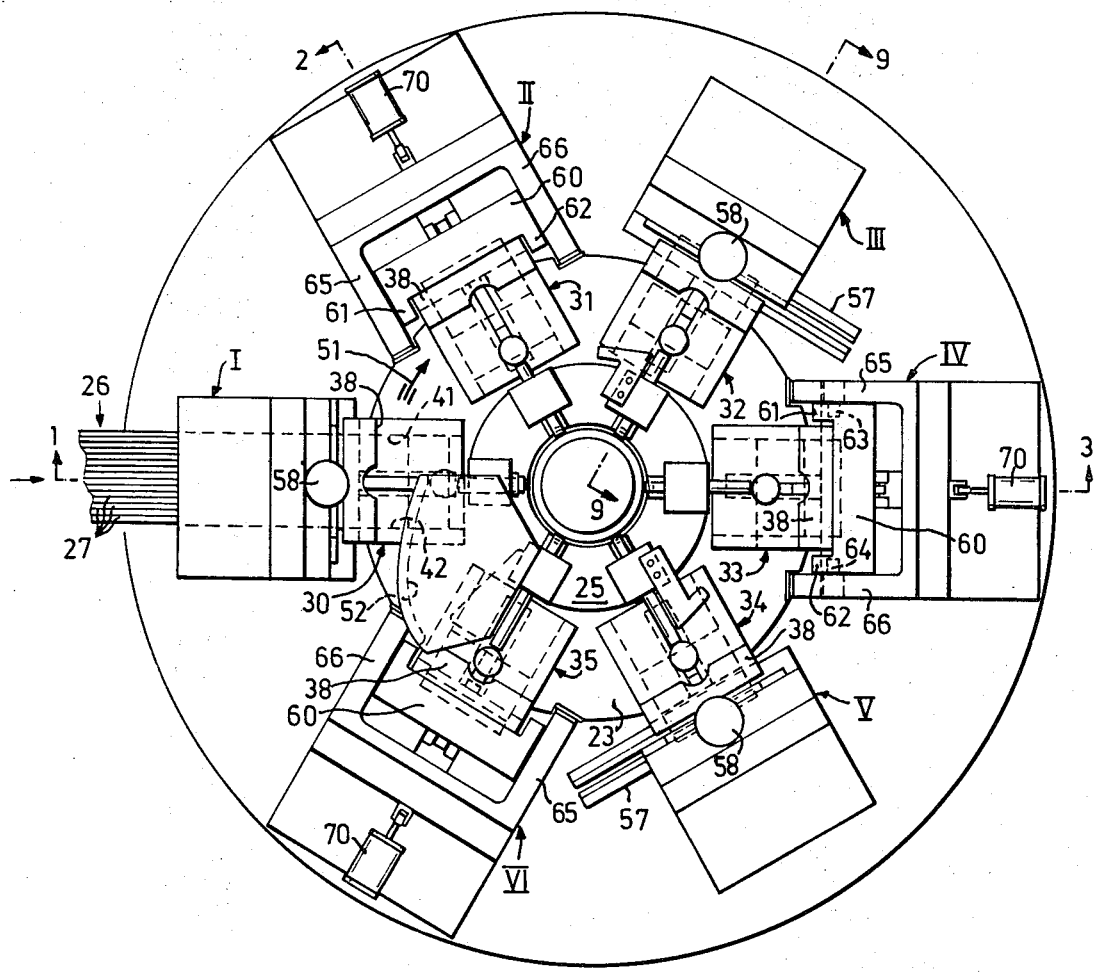

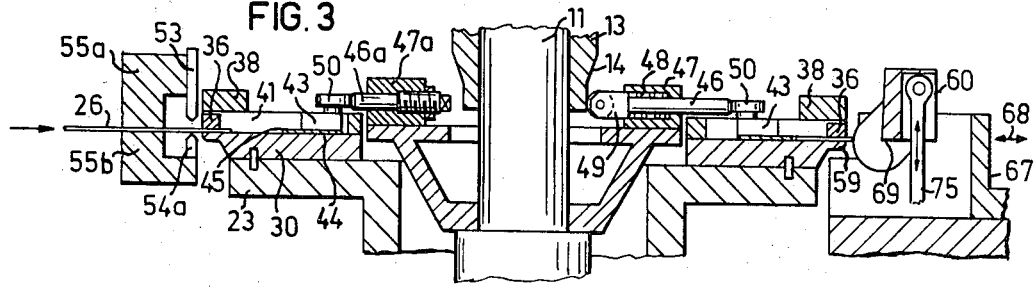

United States Patent Office 3,540,212
Patented Nov. 17, 1970

3,540,212
STAPLE BAR PRODUCING MACHINES
Sten Gustav Birger Olfalk, Malmo, Sweden, assignor to
Carl Erik Josef Nyberg, Skovde, Sweden
Filed Nov. 27, 1968, Ser. No. 779,559
Claims priority, application Sweden, Nov. 27, 1967,
16,217/67
Int. Cl. B21d 53/46
U.S. Cl. 59—75                                           8 Claims

ABSTRACT OF THE DISCLOSURE

As shown in FIGS. 1 and 2 in the enclosed drawings, a predetermined length of a strip of bonded metal wires corresponding to three U-shaped staple bars is cut from a continuous strip 26 and clamped to an indexing table 23 at station 1. Equally spaced along the circumference of the table are six stationary stations I–VI. The stations II, IV and VI have bending members 60 for bending the radial outer end portion of the respective strip piece to a staple bar, and the stations III and V have cutting members 53, 54 for cutting of the respective bar when formed. Upon each cycle of operations at the respective station three staple bars are produced.

---

The present invention relates to machines for producing U-shaped staple bars from a plurality of parallel metal wires bonded together.

In machines hitherto used a continuous strip is cut at its end into successive strip portions having a length corresponding to one staple bar only which is formed by successive bending of the strip portion. To increase the production rate it will be necessary to use one or more further machines. Thus the required workshop space will be considerably increased as well as the machine cost.

The general object of the invention is to provide a machine of the kind under consideration which will enable an increased production rate with a single machine which requires less space than two or more machines of the known kind and which is simple and cheap in construction with respect to its production rate as compared to the number of known machines required for obtaining the same production rate.

These and other objects and advantages of the invention will be disclosed more in detail with reference to the accompanying drawings which by way of example illustrate a preferred embodiment of the machine according to the invention.

FIG. 2 is a plan view.

FIGS. 3–7 are diagrammatic sections along line 1–3 through stationary stations I and IV with the cutting members or tools at station I and the clamping and feeding members at station IV shown in various positions during a cycle of operations, and FIGS. 8–12 are diagrammatic sections along line 9—9 in FIG. 2 to illustrate various positions of the cutting members and feeding members at station III upon the same cycle as illustrated in FIGS. 3–7.

Figure 13:
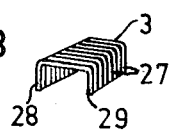

FIG. 13 is a perspective view of a staple bar.

Figure 1:
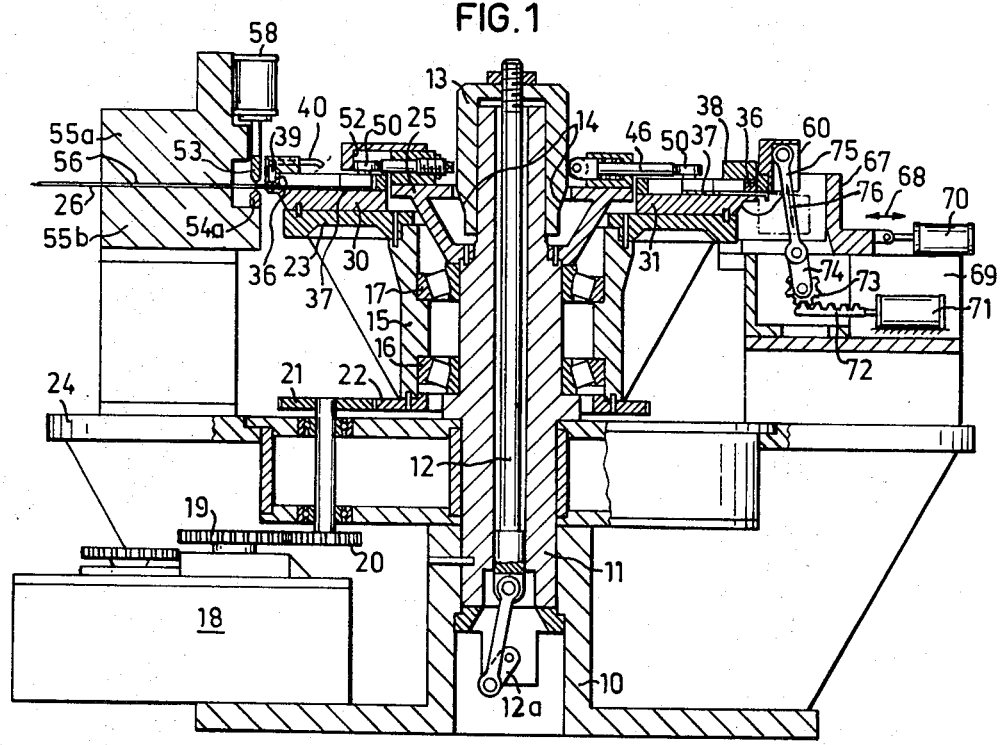
FIG. 1 is a diagrammatic axial section through the machine along line 1—1 in FIG. 2 through stationary stations I and II for cutting and bending respectively.

With reference to FIG. 1 the machine comprises a base column 10 supporting a hollow and stationary shaft 11. In the cylindrical bore of the shaft 11 is a reciprocable shaft 12 supporting at its upper end a cam sleeve 13 which has a number of axial cam surfaces 14 spaced around its circumference.

A cylindrical drum 15 is rotatably mounted on the shaft 11 by means of bearings 16, 17 and is intermittently rotated by an electric motor located in a gear box 18 and connected through a number of gear wheels 19, 20, 21 and 22 with a ring shaped indexing table 23 which is intermittently driven at predetermined intervals.

The machine is intended to be driven continuously, and therefore all movable parts of the machine are moving in timed or synchronized relationship which may be obtained by means of any conventional driving and synchronizing mechanisms well known in the art, and therefore not described in detail in this specification. For example the reciprocable rod 12 is driven by a crank 12a, synchronized with the indexing of the table 23 in a manner to be described as to the timed relationship.

Equally spaced along the circumference of the table 23 are six stationary stations I–VI (FIG. 2) having operative members supported by a bottom ring 24 secured to the frame of the machine, and an upper ring 25 secured to the stationary shaft 11.

In the example shown a continuous strip 26 is fed to station I by any suitable conventional feeding means not shown and drivingly connected with the electric motor 18 to provide an intermittent feeding movement. The strip 26 comprises a plurality of metal wires 27 bonded together to form a blank strip known per se to be used for forming U-shaped staple bars of the configuration shown in FIG. 13. The sum of the lengths of the two legs 28, 29 and the neck 3 of the bar is the length of the strip portion required to form a single bar. In prior machines merely one such strip portion is cut off from the continuous strip 26 and bent to a staple bar before next strip portion be cut off. In contrast to such prior machines the present invention has devised a machine which handles a strip piece which when entering the machine has a length corresponding to at least two strip portions to be formed to at least two staple bars. In the example shown the length of the strip piece cut off from the continuous strip 26 at station I has a length corresponding to three bars to be successively formed by bending operations at stations II, IV and VI, the first bar being cut off at station III, the second at station V, whereas the third bar is formed by the rest portion of the strip piece by bending at station VI. This means that upon a complete cycle of operations at each station, that is upon feeding the strip 26 at station I and cutting therefrom a length corresponding to three strip portions or staple bars as indicated on the left hand side of FIGS. 3–7, there will simultaneously be formed three staple bars at stations II, IV and VI. This enables a considerable increase of the production rate of a single machine which needs only one feeding mechanism for feeding the continuous strip 26 to the machine. Furthermore, the machine will be compact in relation to its production capacity.

The machine will now be described more in detail. The indexing table 23 has detachably secured thereto six base plates 30, 31, 32, 33, 34 and 35 spaced along the circumference of the table at the same intervals as the stationary stations I–VI. Each of the base plates defines the position of a movable indexing station which includes a releasable clamping member 36 and a radially movable feeding member 37. The clamping member 36 is diagrammatically illustrated in the figures as a crossbar located at the radially outer end of the respective base plate such as plate 30 in FIG. 3, and below a transverse member 38 which is secured to the base plate 30 and supports a power means such as a hydraulically operable piston 39 as indicated in FIG. 1. Hydraulic fluid under pressure is intermittently supplied from a source not shown through a conduit 40, only shown in FIG. 1, at each indexing station on the indexing table 23.

Each base plate such as 30 in FIGS. 2 and 3 has two spaced radial side walls 41 and 42 forming a guide for a radially slidable block 43 having a feeding plate 44 sliding on the surface of the bottom plate. The radially outer end of the feeding plate 44 forms an abutment limiting the input of the strip 26 to the desired length as will be understood from the left hand side of FIGS. 3–7. This feeding plate is further used for intermittently displacing the strip portion on the base plate radially outwardly after each bending operation as will be understood from the right hand side of FIGS. 3–7 and FIGS. 8–12. The radial position of the block 43 and its feeding plate 44 is controlled by a push rod 46 movable in a holder 47 secured to the stationary ring. There is a push rod 46 at each stationary station I–VI. However, the push rod 46a at station I has an adjustable fixed position in a holder 47a as will be seen from FIG. 3. All the other push rods 46 are urged by a spring 48 toward the adjacent cam surface 14 on the sleeve 13. As will be seen from FIG. 3 the cam surfaces 14 at the stations II–VI have different radial positions to effect the displacements required at the respective stationary station as will be understood from the right hand side of FIGS. 3–7 and FIGS. 8–12. To reduce friction the inner end of each push rod 46 has a roller 49 engaging the adjacent cam surface 14, whereas the outer end of rod 46 engages a roller 50 mounted on the respective block 43. Although not shown the opposite sides of each block 43 has longitudinal ridges sliding in corresponding longitudinal grooves in the side walls 41 and 42 of the respective base plate to guide the block.

When leaving station VI upon rotation of the indexing table in the direction indicated by the arrow 51, the roller 50 will enter a stationary inner cam surface 52 to return the plate 44 to its starting position when entering station I as will be understood from FIG. 2.

The cutting members or tools located at the stationary stations III and V are identical with those shown in FIG. 3, whereas the cutting tools at station I are slightly modified.

At stations III and V the cutting tools 53 and 54 are supported by a rigid U-shaped member 55 which is secured to the stationary bottom ring 24, whereas at station I this U-shaped member corresponds to an upper portion 55a supporting the upper cutting tool 53 and adjustable in height relative to a lower portion 55b to form horizontal passage 56 for the strip 26 in the same radial plane as the upper surfaces of the base plates 30–35. The portion 55b supports the lower cutting tool 54a.

Figure 8:
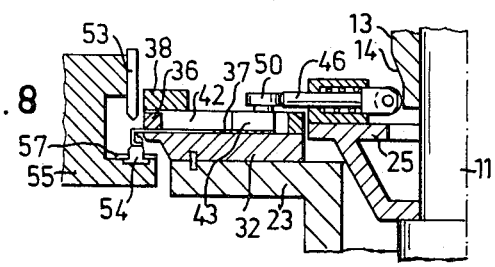
Figure 9:
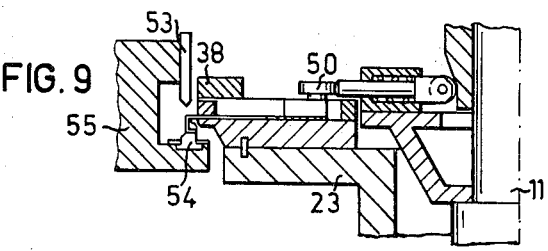
Figure 10:
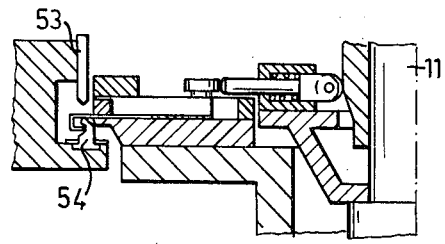
Figure 11:
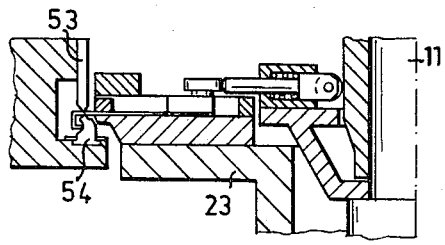
Figure 12:
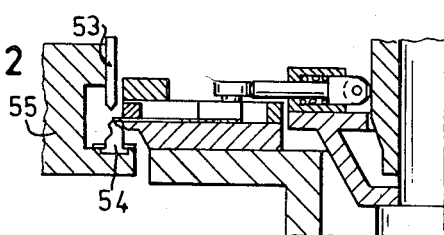

The lower cutting tool 54 at stations III and V is a bar which has the cross-sectional profile shown in FIGS. 8–12 and which is power operated by a pneumatic cylinder and piston (not shown) to move along a transverse guide 57 between an inner position as shown in FIGS. 10 and 11, and an outer position as indicated in FIGS. 8, 9 and 12 in which the projecting end of the strip piece held on the base plate may be moved into the respective cutting station without being obstructed by the lower cutting tool 54. Accordingly, this tool 54 is only held in its inner end position during that cycle period when the strip piece is to be cut off as shown in FIGS. 10 and 11.

The slight modification of station I is that the lower cutting tool 54a, FIGS. 1 and 3–7, is secured to the member 55b and is thus stationary because in this position it will not interfere with the strip piece which all the time is straight at this station and is first bent when arrived to station II.

The upper cutting tool 53 is power operated by a pneumatic cylinder and piston 58 to be urged downwardly for cutting the strip piece as shown in FIGS. 6 and 11. The cylinder and piston 58 is omitted in FIGS. 3–12 for the sake of simplicity.

As will be seen from the drawings, the base plates 30–35 are at their radially outer edges shaped as forming edges 59 for the bending operations.

The base plates 30–35 may be easily exchanged when other sizes and forms of staple bars are to be produced. The ring 25, the feeding members and the sleeve 13 are then also exchanged to suit the new staple bars to be produced.

Each of the stations II, IV and VI have a rotatable and radially retractable bending member 60 which is movable to various positions as shown in FIGS. 3–7.

The bending member 60 is a transverse bar of substantially rectangular cross-section which at its ends has projecting lugs 61, 62 rotatably supported by pivot pins 63, 64 (FIG. 2, station IV) secured in the side walls 65, 66 of a radially displaceable support member 67 which is radially reciprocable as indicated by the arrow 68.

The axis of rotation of the bending member 60 coincides with that corner 69 of the member 60 which is adjacent the forming edges 59 of the bottom plates 30–35 and is located substantially in the same plane as the upper surfaces of the bottom plates 30–35.

As will be seen from FIG. 1 each support member 67 is displaceably mounted on a stationary base member 69 and displacement is effected by means of a pneumatic piston and cylinder 70 secured to the base member 69. The support member 67 is movable between an inner end position as shown in FIGS. 4, 5 and 6, and an outer end position as shown in FIGS. 3 and 7. Further, the base member 69 supports a pneumatic piston and cylinder 71 reciprocating a rack 72 to rotate a toother wheel 73 attached to one end of a crank 73 which is rotatably supported by the base member 69 and connected with the bending member 60 through a connecting rod 75. Thus the rod 75 will be reciprocated up and down as indicated by the arrow 76 (FIG. 1) to move the bending member 60 between its upper end position shown in solid lines, and its lower end position shown in dotted lines in the figures.

When the strip piece is in a position to be bent, the support member 67 is moved to its inner end position, in which the bending is performed, and thereafter the support member is returned to its outer end position.

The various movable details may for example be synchronized to perform a cycle of 2.0 seconds in the following series of periods. The time for indexing the table 23 to the position shown in FIG. 2 from the previous operative position of the table may be 0.6 s., that is indexing of all indexing stations 30–35 is made in the period 0–0.6. In this period the clamping member 36 at station I is moved to its upper released position to be prepared for receiving the strip 26 which is fed into station I during a period 0.6–1.2. At stations II, IV and VI, the bending members 60 are moved by the support members 67 to their inner end positions during a period 0.6–0.8 and at the same time the clamping members are urged to clamping position which also happens at stations III and V. The clamping at last-mentioned stations is terminated at the end of period 0.6–1.0. At stations II, IV and VI the bending members 60 are rotated to their lower position for effecting a bending of the strip piece held at the respective station which is made during period 0.8–1.0. At the stations II–VI the clamping members 36 will be released and the respective strip piece will be fed a step radially outwardly during period 1.0–1.2.

During period 1.2–1.4 all clamping members 36 will be urged to hold the respective strip piece, and at stations III and V the lower cutting members 54 will be displaced to their inner operative positions.

During period 1.4–1.6 cutting is effected at station I, bending at stations II, IV and VI, and cutting at stations III and V.

During period 1.6–1.8 the bending members 60 are returned to their initial positions at stations II, IV and VI. During this period the lower cutting members 54 are displaced to their free outer positions at stations III and V.

What I claim is:

1. A machine for producing U-shaped staple bars from a strip piece of a plurality of parallel metal wires bonded together, comprising a rotatable indexing table for successively receiving strip pieces of a predetermined length at a strip receiving station, a number of strip cutting and strip bending members provided at stationary stations at spaced intervals along the circumference of the table and including said strip receiving station, and a number of strip clamping and feeding members located at indexing stations on the table and adapted each to hold a strip piece and successively feed it radially into positions for cutting and bending so as to produce at least two staple bars from each of said strip pieces of said predetermined length.

2. A machine as set forth in claim 1, wherein a first station includes cutting members for separating said strip pieces from a continuous strip to be conveyed to said strip receiving station, each strip piece being engaged by the adjacent clamping member on the table which when indexed moves the strip piece to the next following or second station and its bending members for forming the first bar at one end of the strip piece, said first bar being separated from the strip piece at the next following or third station by means of the cutting members of this station.

3. A machine as set forth in claim 1, wherein each indexing station on the table includes a radial guide for a strip piece, a power operated clamping member mounted at the radially outer end of said guide and bridging the same, said clamping member being movable up and down relative to the table to release or clamp the strip piece in the guide respectively.

4. A machine as set forth in claim 3, wherein the feeding member comprises a feeding plate displaceably mounted in said guide and movable longitudinally in said guide to engage the inner end of the strip piece for feeding it radially outwardly when the clamping member is released, to a position where the free projecting end portion of strip piece is intended to be subjected to the action of the bending member or cutting members respectively of the adjacent stationary station.

5. A machine as set forth in claim 4 wherein a non-rotatable sleeve is axially movable on a stationary shaft co-axial with the rotor axis of the table and formed with circumferentially spaced axial cam surfaces adapted to cooperate with the inner ends of a number of radially movable push rods having their radially outer ends in engagement each with members supporting said feeding plates to displace them a predetermined distance radially outwardly when effecting an axial stroke of said sleeve.

6. A machine as set forth in claim 4, wherein a base plate is secured to the table at each indexing station and is formed with said guide for the strip pieces, the radially outer end of said base plate being shaped as a transverse forming edge to support the respective strip piece when subjected to the action of the respective bending member.

7. A machine as set forth in claim 6, wherein the stationary stations having bending members are provided with a radially movable support carrying a pivotable power operated bending member which in a radially inner end position of said support has its pivot axis located close to the clamped strip piece and the clamping member to effect a bending at right angles over the forming edge of the base plate when pivoting the bending member.

8. A machine as set forth in claim 1, wherein every second stationary station after the strip receiving station is provided with an upper, vertically movable cutting member and a lower cutting member which is movable in its longitudinal direction between an inner operative position beneath the upper cutting member and an outer free end position in order not to interfere, upon indexing the table, with the projecting end portions of the strip pieces held at the indexing stations.

References Cited

UNITED STATES PATENTS

| 142,574 | 9/1873 | Malick | 59—75 |
| 3,383,852 | 5/1968 | Heimlicher | 59—76 |

FOREIGN PATENTS

| 1,197,845 | 8/1965 | Germany. |
| 327,159 | 7/1935 | Italy. |

CHARLES W. LANHAM, Primary Examiner

G. P. CROSBY, Assistant Examiner